UNITED STATES PATENT OFFICE.

SAMUEL SANBORN, OF SAN FRANCISCO, CALIFORNIA.

PRESERVATIVE FOR MILK.

SPECIFICATION forming part of Letters Patent No. 327,023, dated September 29, 1885.

Application filed May 27, 1885. (No specimens.)

*To all whom it may concern:*

Be it known that I, SAMUEL SANBORN, a citizen of the United States, and a resident of the city of San Francisco, county of San Francisco, and State of California, have invented a new and useful composition of matter for the purpose of preserving milk; and I hereby declare the following to be a full, clear, and exact specification thereof.

My composition consists of the following ingredients: sugar, salt, nitrate of potash, soda, hyposulphite of soda, and sulphite of lime, to be combined in about the following proportions: sugar, six pounds; salt, two pounds; nitrate of potash, four ounces; carbonate of soda, one ounce; hyposulphite of soda, three ounces; sulphite of lime, two ounces. All of these are to be dissolved in sufficient water to make the whole amount to three gallons of the preservative. One gill of this preservative will keep three gallons of milk for several days in very warm weather.

The sugar and salt, when used in the proportions in which I use them in my preservative, take away the peculiar taste that would be present in the milk were the other ingredients used without the sugar and salt.

I am aware of a preservative patented by William Ross, January 1, 1867, and bearing the number 60,942; but I find that my preservative will keep milk sweet much longer than Ross's, from the fact that my preservative contains hyposulphite of soda and sulphite of lime, which Ross's does not, and the particular proportions in which I combine the ingredients in my preservative causes the elements to so act upon each other that no unpleasant taste is produced in the milk.

Having thus described my invention, what I claim as new, and desire to secure by Letters Patent, is—

The preparation for keeping milk sweet, consisting of sugar, salt, nitrate of potash, carbonate of soda, hyposulphite of soda, and sulphite of lime, in the proportions substantially as herein described.

In witness whereof I have hereunto set my hand.

SAMUEL SANBORN.

Witnesses:
  JOHN DIXON,
  CLARENCE SANBOBN.